Patented July 22, 1941

2,250,422

UNITED STATES PATENT OFFICE 2,250,422

ALKYL-CROTYL BARBITURIC ACIDS AND THEIR SALTS

Horace A. Shonle and Wilbur J. Doran, Indianapolis, Ind., assignors to Eli Lilly and Company, Indianapolis, Ind., a corporation of Indiana No Drawing. Application July 30, 1938, Serial No. 222,148

16 Claims. (Cl. 260—257)

It is the object of our present invention to produce certain 5,5-disubstituted barbituric acids, and their salts, in which one substituent is the crotyl group (1)   $CH_3-CH=CH-CH_2-$ and the other substituent is an alkyl group containing from 2 to 6 carbon atoms and with no branching of the carbon chain save where there is in the group one straight chain of at least 2 carbon atoms extending from the carbon atom at which the branching occurs. The second substituent is capable of considerable variation, of which the following are examples:

(a) Ethyl
(b) n-Propyl
(c) n-Butyl, sec.-butyl
(d) n-Amyl, isoamyl, 1-methyl-butyl, 2-methyl-butyl, 1-ethyl-propyl
(e) n-Hexyl, isohexyl, sec.-hexyl, 2-ethyl-butyl.

These new disubstituted barbituric acids of which one substituent is the crotyl group, and their salts, which are included in this present application, all have hypnotic action. They are all represented by the following formula:

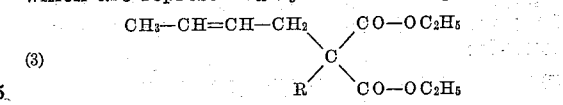

(2)

in which R represents an alkyl group which contains from 2 to 6 carbon atoms and which has no branching of the carbon chain save when there is in the group one straight chain of at least two carbon atoms extending from the carbon atom at which the branching occurs; and X represents a member of the class consisting of hydrogen (if the compound is an acid), and (if the compound is a salt) an alkali metal, such as sodium, an equivalent of an alkaline-earth metal, such as calcium, and ammonium, mono-alkyl ammonium, such as $-NH_3CH_3$, di-alkyl ammonium, such as $-NH_2(C_2H_5)_2$, and alkanol ammonium, such as $-NH_3CH_2CH_2OH$.

These new salts and acids may be prepared in various ways, of which the following two are illustrative:

A. They may be made from certain new disubstituted malonic esters, usually ethyl esters, which are represented by the following formula:

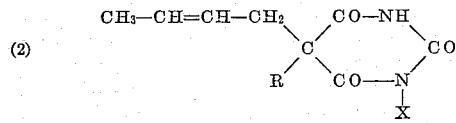

(3)

in which R has the same meaning as before.

B. They may be made by introducing the crotyl group into a mono-R-substituted barbituric acid.

In either of these methods, a cyanacetic ester may be used instead of the malonic ester; in which case the resulting imino-barbituric acid is converted by acid hydrolysis into the corresponding barbituric acid.

We will discuss these two methods in order, and give one or more examples under each.

METHOD A

In discussing Method A, we shall describe first the respective disubstituted malonic esters, and then the disubstituted barbituric acids, and the procedures for respectively producing them.

Disubstituted malonic esters

In making the disubstituted malonic esters, we condense a crotyl halide, such as the bromide or chloride, with the appropriate mono-R-substituted malonic ester, or the appropriate R-halide with crotyl malonic ester, in the presence of sodium ethylate, in the manner customary for making disubstituted malonic esters. For example:

Ethyl crotyl malonic ester

One mol of sodium is dissolved in from 10 to 12 times its weight of absolute alcohol, under a reflux condenser. One mol of ethyl malonic ester (ethyl ethylmalonate) is then added. Part of the alcohol that was used may then be removed, as by vacuum distillation, and then about 1.1 mols of crotyl bromide (or crotyl chloride) is gradually added. The crotyl bromide (or crotyl chloride) used is desirably fairly freshly prepared, and relatively free from isomers. (See Winstein and Young, Jour. Am. Chem. Soc., volume 58, p. 104, 1936.) The mixture is refluxed for some hours, until it no longer shows an alkaline reaction to moist litmus paper. Most of the alcohol remaining, whether or not some had previously been removed, is now removed by vacuum distillation, leaving an oily residue. Water is added to this residue to dissolve out the sodium bromide (or chloride) present in it; and the oily layer, which contains the desired ethyl crotyl malonic ester, is separated and dried. This crude ethyl crotyl malonic ester is fractionally distilled in vacuo. Two fractions are obtained. The first fraction, boiling at about 104–108° C., uncorrected, at 6 mm., was found to be ethyl 1-methyl-allyl malonic ester, an isomer of ethyl crotyl malonic ester. The second fraction, boiling at about 114–118° C., at 6 mm., is the desired ethyl crotyl malonic ester. It is a colorless or pale-yellow liquid; and is represented by the following formula:

(4) 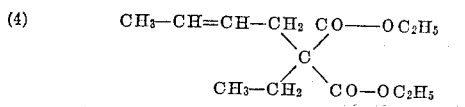

*1-methyl-butyl crotyl malonic ester*

This may be prepared in the same general manner as described above for ethyl crotyl malonic ester, save that instead of using ethyl malonic ester 1-methyl-butyl malonic ester is used. The 1-methyl-butyl crotyl malonic ester obtained is a colorless or pale-yellow liquid; which has a boiling point of about 140–145° C., uncorrected, at 10 mm. It is represented by the following formula:

(5) 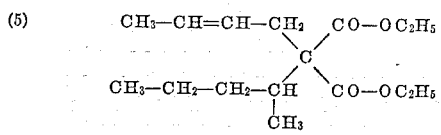

The other alkyl crotyl malonic esters contemplated as intermediates in our present invention may all be prepared in this same general manner.

*Disubstituted barbituric acids*

Disubstituted barbituric acids corresponding to these various disubstituted malonic esters may be obtained. These barbituric acids are represented by the following formula:

(6) 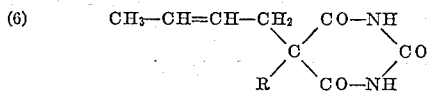

in which R has the same significance as before.

In general, the method of preparing such disubstituted barbituric acids is as follows:

Three mols of sodium are dissolved in 10 to 12 times its weight of absolute alcohol under a reflux condenser. To this are added about 1.6 mols of urea and one mol of the disubstituted malonic ester of which the corresponding barbituric acid is desired. The mixture is gently refluxed for from 12 to 15 hours, after which most of the alcohol is removed by vacuum distillation. The residue is dissolved in water, and a sufficient amount of dilute acid, such as hydrochloric acid, is added to completely throw out of solution the disubstituted barbituric acid which has been formed. This disubstituted barbituric acid comes out of solution in some cases as a solid, and in some cases as an oily liquid which solidifies on standing. The disubstituted barbituric acid so obtained is separated, as by filtration; is then dried, and may be washed with gasoline; and is then purified by recrystallization, as from dilute alcohol. The barbituric acids thus obtained are all white solids, generally crystalline; are insoluble in water, and readily soluble in alcohol and ether; are bitter-tasting; and have hypnotic action.

The disubstituted barbituric acids which are obtained from the malonic esters given as examples are the following:

*Ethyl crotyl barbituric acid*

Ethyl crotyl barbituric acid may be obtained, after recrystallization from dilute alcohol, in two forms; one of which melts at 108–110° C., corrected, and the other of which melts at 120–121° C., corrected. (When "corrected" temperatures are given in this specification, it is meant that the temperatures are those obtained by short-stem Anschütz thermometers, as distinguished from the "uncorrected" temperatures obtained by long-stem thermometers.) It is believed that these two forms are cis and trans isomers; since on catalytic reduction both forms are converted into the same ethyl n-butyl barbituric acid. Both forms of ethyl crotyl barbituric acid are represented by the following general formula:

(7) 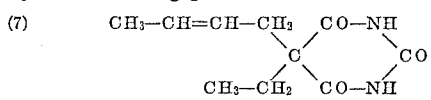

This is the only one of the disubstituted barbituric acids contemplated by our present invention in which we have actually obtained and separated both cis and trans forms, but it may be that both forms exist for others of these disubstituted barbituric acids, and the ones of which properties are specified may be either in the cis form or the trans form.

*1-methyl-butyl crotyl barbituric acid*

This has a melting point, after recrystallization from dilute alcohol, of 110–113° C., corrected. It also may be obtained in the form of a hydrate or alcoholate melting at 88–90° C., corrected. The unhydrated form is represented by the following formula:

(8) 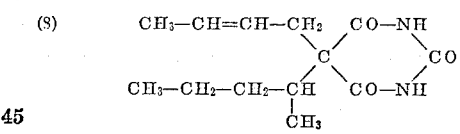

METHOD B

In Method B, the crotyl group is introduced into a mono-R-substituted barbituric acid, where R is an alkyl group of the character defined above.

The general method of doing this is as follows:

One mol of the mono-R-substituted barbituric acid, (which in most instances contemplated in this application is a known mono-R-substituted barbituric acid, and in any case can be prepared in a manner analogous to that used in preparing known mono-substituted barbituric acids,) is dissolved in a 10% to 35% aqueous solution of one mol of potassium hydroxide or sodium hydroxide. To this are added somewhat in excess of one mol of a crotyl halide, such as crotyl bromide, and alcohol in suitable amount, preferably sufficient to make a homogeneous solution. There is also preferably added a suitable catalyst, such as a copper salt. The reaction may be caused to go to completion either by agitating the mixture for 50 to 75 hours at room temperature, or slightly above, or by refluxing it for a briefer period. Then the solution, which may still exhibit two layers if the alcohol concentration is low, is freed from alcohol and from any unreacted crotyl halide, as by vacuum distillation. On cooling, the disubstituted barbituric acid separates either as a solid or as an oily liquid which solidifies on standing. This is dried, washed with petroleum ether, and dissolved in a minimum amount of a suitable organic solvent, conveniently benzene. The solution thus obtained is preferably washed with a dilute solution of sodium bicarbonate to remove any unreacted mono-substituted barbituric acid. The new disubstituted barbituric acid is extracted from the benzene (or other organic solvent) solution with a dilute sodium-hydroxide solution. Acidification of this extract with dilute acid, conveniently hydrochloric acid, causes the barbituric acid to precipitate in a solid or semi-solid form which crystallizes on standing. The crude barbituric acid is separated from the water, and purified by recrystallization, as from dilute alcohol.

Any of the alkyl crotyl barbituric acids contemplated by the present invention may be made by this Method B. Examples of them are the following:

n-Propyl crotyl barbituric acid

This is a white crystalline solid which after recrystallization from dilute alcohol has a melting point of 160–161° C., corrected; and is represented by the following formula:

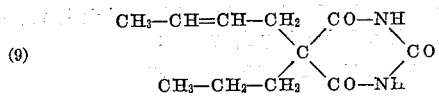

n-Butyl crotyl barbituric acid

This is a white crystalline solid which after recrystallization from dilute alcohol has a melting point of 142–143° C., corrected; and is represented by the following formula:

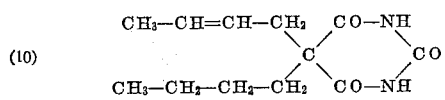

Sec.-butyl crotyl barbituric acid

This is a white crystalline solid which after recrystallization from dilute alcohol has a melting point of 130–131° C., corrected; and is represented by the following formula:

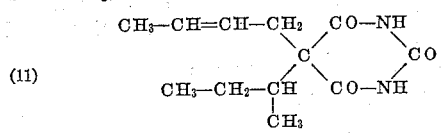

Iso-amyl crotyl barbituric acid

This is a white crystalline solid which after recrystallization from dilute alcohol has a melting point of 147–148° C., corrected; and is represented by the following formula:

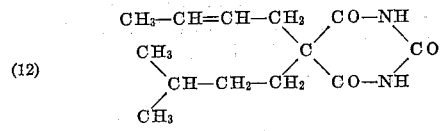

All the disubstituted barbituric acids contemplated by the present invention are excellent hypnotics.

BARBITURATES

From any of the barbituric acids contemplated by the present invention, barbiturates may readily be obtained which are represented by Formula 2 above with X representing an alkali metal, an equivalent of an alkaline-earth metal, ammonium, mono-alkyl ammonium, di-alkyl ammonium, or alkanol ammonium. These barbiturates may be obtained by reaction with the desired disubstituted barbituric acid, in a suitable solvent, with either the hydroxide or the ethylate of the desired inorganic base, or with ammonia, or with the desired alkyl or alkanol amine. For instance:

Alkali metal salts

The sodium salts of these disubstituted barbituric acids are all represented by the following general formula:

(13) 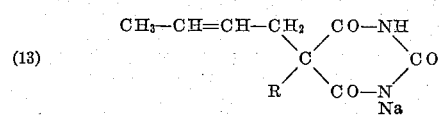

in which R has the same significance as before. The other alkali-metal salts have the same general formula, save for the substitution of the other metal for sodium. These salts are prepared as follows: A solution of one mol of the hydroxide or ethylate of the alkali metal, such as sodium, is added to a suspension or solution in a suitable solvent, such as alcohol, of one mol of any of the herein-contemplated disubstituted barbituric acids; which produces the desired barbiturate in solution. The amount of solvent used is desirably sufficient to dissolve the salts so produced. The solution is evaporated, preferably under vacuum at low temperature, and desirably after filtration, until the salt is obtained in solid form. The sodium salts of the various disubstituted barbituric acids given as examples are the following:

Sodium ethyl crotyl barbiturate.
Sodium 1-methyl-butyl crotyl barbiturate.
Sodium n-propyl crotyl barbiturate.
Sodium n-butyl crotyl barbiturate.
Sodium sec.-butyl crotyl barbiturate.
Sodium isoamyl crotyl barbiturate.

The formulas of these barbiturates are the same as those of the corresponding barbituric acids, save for the substitution of sodium for hydrogen at the point corresponding to X in Formula 2.

These sodium salts are all white solids, soluble in water and alcohol, and insoluble in ether. They are all bitter-tasting, and their aqueous solutions are alkaline in reaction. They are all excellent hypnotics, when administered either orally or hypodermically.

When these salts are desired in stable form sufficiently free from contaminants so that clear water solutions thereof suitable for intravenous injection may be obtained, they may be so obtained by the method set forth in the Shonle Patent No. 1,856,792, granted May 3, 1932.

Ammonium and alkyl-amine and alkanol-amine salts

One mol of any of the above-described 5,5-disubstituted barbituric acids is dissolved in or added to somewhat more than one mol of an aqueous or alcoholic solution of concentrated ammonia, or of an alkyl amine, such for instance as mono- or di-methyl amine or mono- or di-ethyl amine, or of an alkanol amine, such for instance as ethanol amine or propanol amine. The resulting barbiturate crystallizes out, or is concentrated to solid form. The formulas of these barbiturates correspond in general to the formulas of the acids, save that NH4 or the proper substituted-ammonium radical is substituted for H at the point X of Formula 2.

We claim as our invention:

1. A barbituric compound which is represented by the following formula:

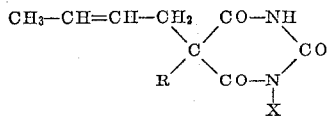

in which R represents an alkyl group which contains from 2 to 6 carbon atoms and which has no branching of the carbon chain save when there is in the group one straight chain of at least two carbon atoms extending from the carbon atom at which the branching occurs; and X represents a member of the class consisting of hydrogen, an alkali metal, an equivalent of an alkaline-earth metal, ammonium, mono-alkyl ammonium, di-alkyl ammonium, and alkanol ammonium.

2. A barbituric acid which is represented by the following formula:

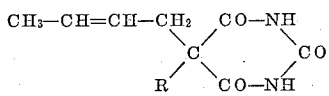

in which R represents an alkyl group which contains from 2 to 6 carbon atoms and which has no branching of the carbon chain save when there is in the group one straight chain of at least two carbon atoms extending from the carbon atom at which the branching occurs.

3. A barbituric compound which is represented by the following formula:

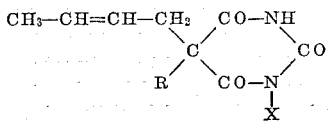

in which R represents a straight-chain alkyl group which contains from 2 to 6 carbon atoms; and X represents a member of the class consisting of hydrogen, an alkali metal, an equivalent of an alkaline-earth metal, ammonium, monoalkyl ammonium, di-alkyl ammonium, and alkanol ammonium.

4. A barbituric acid which is represented by the following formula:

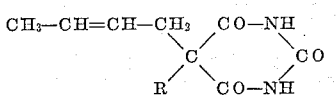

in which R represents a straight-chain alkyl group which contains from 2 to 6 carbon atoms.

5. A barbituric compound which is represented by the following formula:

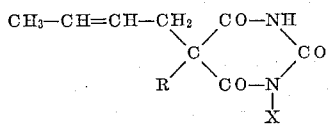

in which R represents a branched-chain alkyl group which contains from 2 to 6 carbon atoms but which has no branching of the carbon chain save when there is in the group one straight chain of at least two carbon atoms extending from the carbon atom at which the branching occurs; and X represents a member of the class consisting of hydrogen, an alkali metal, an equivalent of an alkaline-earth metal, ammonium, mono-alkyl ammonium, di-alkyl ammonium, and alkanol ammonium.

6. A barbituric acid which is represented by the following formula:

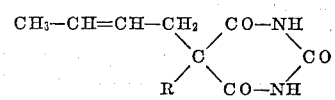

in which R represents a branched-chain alkyl group which contains from 2 to 6 carbon atoms but which has no branching of the carbon chain save when there is in the group one straight chain of at least two carbon atoms extending from the carbon atom at which the branching occurs.

7. An n-butyl crotyl barbituric compound which is represented by the following formula:

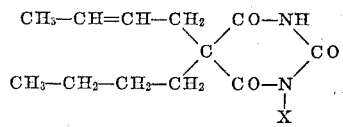

in which X represents a member of the class consisting of hydrogen, an alkali metal, an equivalent of an alkaline-earth metal, ammonium, mono-alkyl ammonium, di-alkyl ammonium, and alkanol ammonium.

8. N-butyl crotyl barbituric acid, which is represented by the following formula:

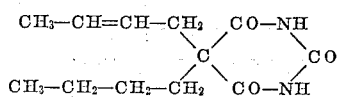

9. A barbituric compound which is represented by the following formula:

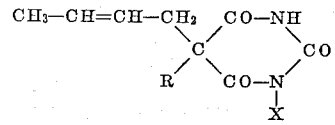

in which R represents an alkyl group of the class consisting of the n-amyl, isoamyl, 1-methyl-butyl, 2-methyl-butyl, and 1-ethyl-propyl groups; and X represents a member of the class consisting of hydrogen, an alkali metal, an equivalent of an alkaline-earth metal, ammonium, mono-alkyl ammonium, di-alkyl ammonium, and alkanol ammonium.

10. A barbituric acid which is represented by the following formula:

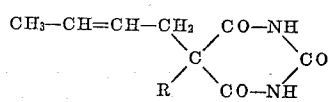

in which R represents an alkyl group of the class consisting of the n-amyl, isoamyl, 1-methyl-butyl, 2-methyl-butyl, and 1-ethyl-propyl groups.

11. A barbituric compound which is represented by the following formula:

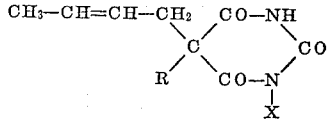

in which R represents a branched-chain alkyl group which has five carbon atoms but which has no branching of the carbon chain save when there is in the group one straight chain of at least two carbon atoms extending from the carbon atom at which the branching occurs; and X represents a member of the class consisting of hydrogen, an alkali metal, an equivalent of an alkaline-earth metal, ammonium, mono-alkyl ammonium, di-alkyl ammonium, and alkanol ammonium.

12. A barbituric acid which is represented by the following formula:

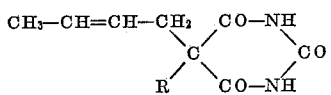

in which R represents a branched-chain alkyl group which has five carbon atoms but which has no branching of the carbon chain save when there is in the group one straight chain of at least two carbon atoms extending from the carbon atom at which the branching occurs.

13. A 1-methyl-butyl crotyl barbituric compound which is represented by the following formula:

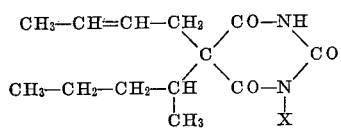

in which X represents a member of the class consisting of hydrogen, an alkali metal, an equivalent of an alkaline-earth metal, ammonium, mono-alkyl ammonium, di-alkyl ammonium, and alkanol ammonium.

14. 1-methyl-butyl crotyl barbituric acid, which is represented by the following formula:

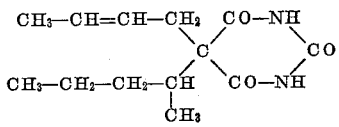

15. An iso-amyl crotyl barbituric compound which is represented by the following formula:

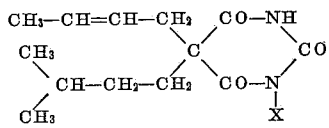

in which X represents a member of the class consisting of hydrogen, an alkali metal, an equivalent of an alkaline-earth metal, ammonium, mono-alkyl ammonium, di-alkyl ammonium, and alkanol ammonium.

16. Iso-amyl crotyl barbituric acid, which is represented by the following formula:

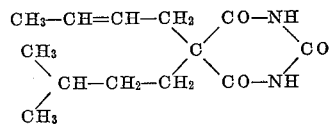

HORACE A. SHONLE.
WILBUR J. DORAN.